US009166678B1

(12) United States Patent
Fish et al.

(10) Patent No.: US 9,166,678 B1
(45) Date of Patent: Oct. 20, 2015

(54) HETEROGENEOUS MICROWAVE PHOTONIC CIRCUITS

(75) Inventors: Gregory Alan Fish, Santa Barbara, CA (US); Volkan Kaman, Santa Barbara, CA (US); Anand Ramaswamy, Goleta, CA (US)

(73) Assignee: Aurrion, Inc., Goleta, CA (US)

( * ) Notice: Subject to any disclaimer, the term of this patent is extended or adjusted under 35 U.S.C. 154(b) by 267 days.

(21) Appl. No.: 13/605,658

(22) Filed: Sep. 6, 2012

(51) Int. Cl.
H04B 10/00 (2013.01)
H04B 10/11 (2013.01)

(52) U.S. Cl.
CPC ............ *H04B 10/00* (2013.01); *H04B 10/11* (2013.01)

(58) Field of Classification Search
CPC .................................................. H04B 10/00
USPC .................................................. 398/115–119
See application file for complete search history.

(56) References Cited

U.S. PATENT DOCUMENTS

| | | | | |
|---|---|---|---|---|
| 5,142,595 A * | 8/1992 | Chester | ............. | 385/37 |
| 5,347,601 A * | 9/1994 | Ade et al. | ............. | 385/3 |
| 5,422,966 A * | 6/1995 | Gopalakrishnan et al. | ........ | 385/2 |
| 5,644,664 A * | 7/1997 | Burns et al. | ............. | 385/2 |
| 5,867,295 A * | 2/1999 | Betts | ............. | 398/194 |
| 6,535,320 B1 * | 3/2003 | Burns | ............. | 359/245 |
| 7,054,342 B2 * | 5/2006 | Minneman et al. | ............. | 372/28 |
| 7,092,645 B1 * | 8/2006 | Sternowski | ............. | 398/204 |
| 7,369,715 B2 * | 5/2008 | Darcie et al. | ............. | 385/3 |
| 7,515,774 B2 * | 4/2009 | Vannuffelen et al. | ............. | 385/1 |
| 7,898,464 B1 * | 3/2011 | Anderson et al. | ............. | 342/54 |
| 8,374,508 B2 * | 2/2013 | Soto et al. | ............. | 398/115 |
| 8,478,127 B2 * | 7/2013 | Chan et al. | ............. | 398/135 |
| 8,498,539 B1 * | 7/2013 | Ilchenko et al. | ............. | 398/115 |
| 8,693,875 B2 * | 4/2014 | Banwell et al. | ............. | 398/115 |
| 2002/0080450 A1 * | 6/2002 | Hait | ............. | 359/158 |
| 2002/0126274 A1 * | 9/2002 | Minneman et al. | ............. | 356/225 |
| 2003/0027597 A1 * | 2/2003 | LaGrotta et al. | ............. | 455/561 |
| 2003/0224801 A1 * | 12/2003 | Lovberg et al. | ............. | 455/454 |
| 2007/0041735 A1 * | 2/2007 | Darcie et al. | ............. | 398/186 |
| 2009/0022500 A1 * | 1/2009 | Pinguet et al. | ............. | 398/164 |
| 2010/0247105 A1 * | 9/2010 | Yu | ............. | 398/116 |
| 2011/0188862 A1 * | 8/2011 | Fuss et al. | ............. | 398/115 |
| 2011/0249936 A1 * | 10/2011 | Welch et al. | ............. | 385/31 |
| 2013/0183041 A1 * | 7/2013 | Wan et al. | ............. | 398/81 |
| 2013/0230328 A1 * | 9/2013 | Fan et al. | ............. | 398/115 |

\* cited by examiner

*Primary Examiner* — Agustin Bello
(74) *Attorney, Agent, or Firm* — Schwegman Lundberg & Woessner, P.A.

(57) ABSTRACT

Embodiments of the invention describe (M)MPICs, which include RF processing components and heterogeneous silicon photonic components that include a first region of silicon material and a second region of non-silicon material with high electro-optic efficiency (e.g., III-V material). Said heterogeneous silicon components are fabricated from the silicon and non-silicon material, and therefore may be interconnected via silicon/non-silicon waveguides formed from the above described regions of silicon/non-silicon material. The effect of interconnecting these components via said optical waveguides is that an RF signal may be processed using photonic components consistent with the size of an MMIC, without the need for any optical fibers; therefore, embodiments of the invention describe a chip scale microwave IC that has the broad optical bandwidth of photonics without any optical interfaces to fiber. Furthermore, in some embodiments, the RF processing components, heterogeneous photonic components, and control circuitry may be included in the same chip-scale package.

17 Claims, 3 Drawing Sheets

HETEROGENEOUS MICROWAVE PHOTONIC CIRCUITS

FIELD

Embodiments of the invention generally pertain to optical devices and more specifically to heterogeneous microwave photonic circuits.

BACKGROUND

Monolithic Microwave integrated circuits (MMICs) are the preferred approach for implementing complex radio frequency (RF) functions due to the circuits' minimal size, weight and power dissipation. Current MMIC solutions begin to struggle to maintain their performance as demand increases for higher bandwidth at higher RF frequencies.

Microwave photonics—the use of photonic devices for signal handling/processing microwave data, has been proposed to enable broader bandwidth and higher frequency operation for RF functions; however, current state of the art has yet to produce solutions that are sufficiently small and have a low enough power dissipation to replace MMICs, Furthermore, the requirement for photonic solutions to use optical fibers as an interconnection medium further increases the size of these solutions and degrades their robustness to harsh environments. What is needed is a chip scale microwave IC that has the broad optical bandwidth of photonics.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Figure 1:
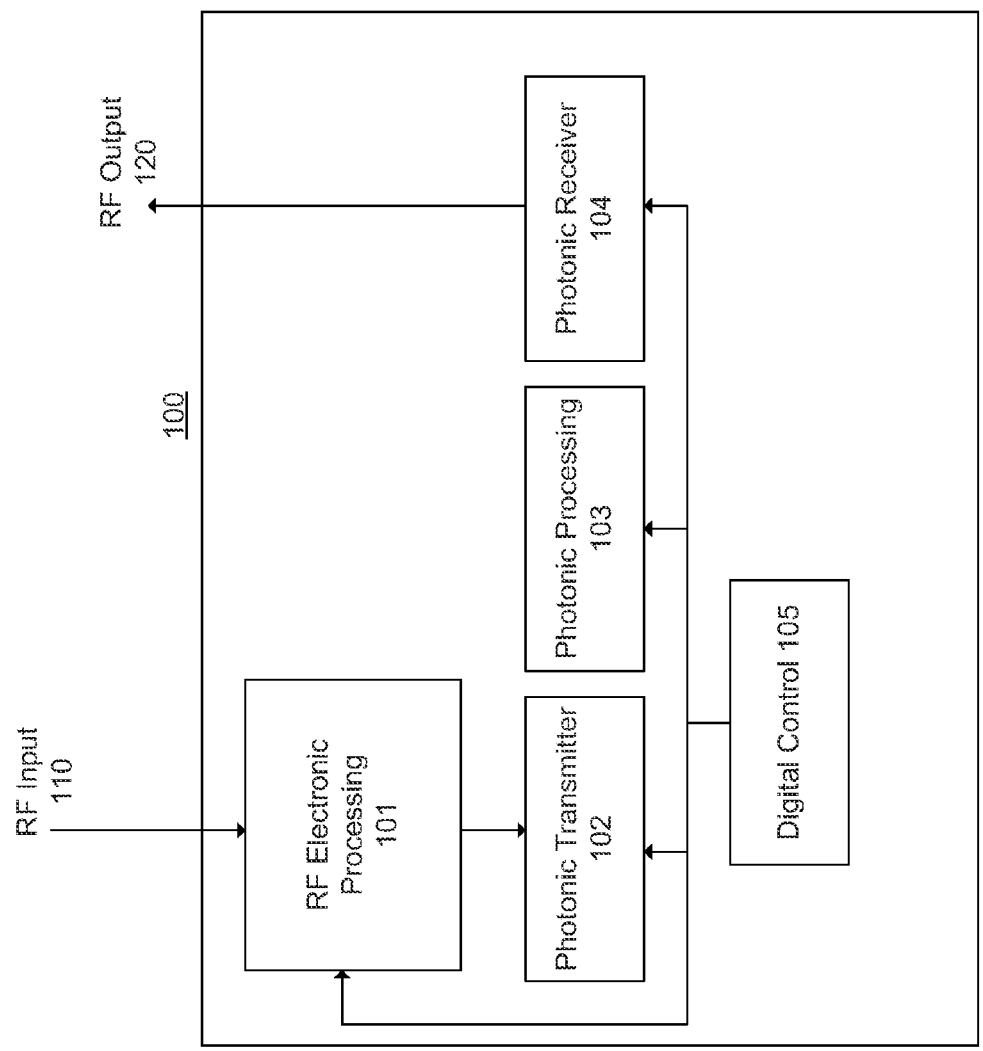
FIG. 1 is a block diagram of a microwave signal processing system according to an embodiment of the invention.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DESCRIPTION

Embodiments of the invention describe methods, systems and apparatuses for utilizing monolithic heterogeneous microwave photonic integrated circuits. More specifically, embodiments of the invention describe heterogeneous silicon photonic components for processing radio frequency (RF) signals received from Microwave integrated circuits (MICs) (e.g., monolithic MICs) or discrete microwave components as described below.

Said heterogeneous photonic integrated circuits (PICs) or components as described herein comprise silicon and a non-silicon semiconductor material. Said non-silicon semiconductor material (herein referred to as "heterogeneous material") may comprise one of III-V material, crystal substrate material or any other materials having optical properties that superior to silicon for performing an optical function. Embodiments of the invention utilize low loss heterogeneous optical waveguide transitions between the devices' heterogeneous and silicon-only regions, and in some embodiments, between different components of a microwave signal processing system.

III-V semiconductors have elements that are found in group III and group V of the periodic table (e.g., Indium Gallium Arsenide Phosphide (InGaAsP), Gallium Indium Arsenide Nitride (GaInAsN)). The carrier dispersion effects of III-V based materials may be significantly higher than in silicon based materials, as electron speed in III-V semiconductors is much faster than that in silicon and these materials often possess a direct bandgap. Thus, III-V semiconductor materials enable photonic operation with an increased efficiency at generating light from electricity and converting light back into electricity. The low optical loss and high quality oxides of silicon may be combined with the electro-optic efficiency of III-V semiconductors in the embodiments described below.

Nonlinear crystal substrate materials provide heterogeneous PICs with a high electro-optical efficiency, low transmission loss, and stable physical and chemical properties. Said crystal substrate materials may comprise, for example, lithium niobate (LiNbO3) or lithium tantalate (LiTaO3).

Throughout this specification, several terms of art are used. These terms are to take on their ordinary meaning in the art from which they come, unless specifically defined herein or the context of their use would clearly suggest otherwise. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

FIG. 1 is a block diagram of a microwave signal processing system according to an embodiment of the invention. In this embodiment, system 100 is configured to receive RF input 110 and transmit RF output 120. System 100 is shown to include RF electronic processing circuits 101, photonic transmitter 102, photonic processing circuits 103, photonic receiver 104 and control circuitry 105.

As described herein, embodiments of the invention utilize photonic components for processing RF signal data. It is understood that the frequency of optical data, which may be, for example, several hundred terahertz (THz), is much higher than the frequency of the signals of RF input 110/RF output 120, which may be, for example, in the gigahertz (GHz) frequency spectrum. Thus, said photonic components operate to upconvert/downconvert the RF data that is received/transmitted.

In this embodiment, RF input 110 is received by RF electronic processing circuits 101, and is processed such that electrical signal data is sent to photonic transmitter 102 (which may comprise, for example, a laser modulator driver).

As described below, the electrical signal data is used to upconvert RF input 100 to photonic frequencies.

The upconverted data is received by RF photonic processing circuits 103 for any type of processing intended for system 100 (e.g. time delay, phase shift, filtering, mixing, etc.). In this embodiment, said photonic processing circuitry is controlled by control circuitry 105. In other embodiments, no additional control circuitry is utilized. The processed data is downconverted back to the RF frequency spectrum via photonic receiver 104 and transmitted from the system as RF output 120.

As described further below, embodiments of the invention improve upon prior art solutions by utilizing "heterogeneous integration" of silicon and heterogeneous materials. Heterogeneous integration as used herein refers to solutions where different functions (such as photonic, RF or electronic) are performed on the same substrate using different materials—e.g., different materials are used for a given function; however, in some embodiments, the materials reside on the same substrate and are processed simultaneously (or substantially so) to create the separate functions. For example, a time delay process may be executed by propagating the signal in a silicon waveguide, whereas reception, up-conversion, and/or down-conversion of RF signal data to photonic frequencies may executed by components comprising a compound semiconductor (e.g. III-V). Said heterogeneous integration—i.e., solutions where different functions (such as photonic, RF or electronic) are performed on the same substrate using different materials, allows for the size of a microwave photonic integrated circuit to be small (compared to prior art solutions), and allows for the elimination of optical fiber interconnects as described below.

Figure 2:
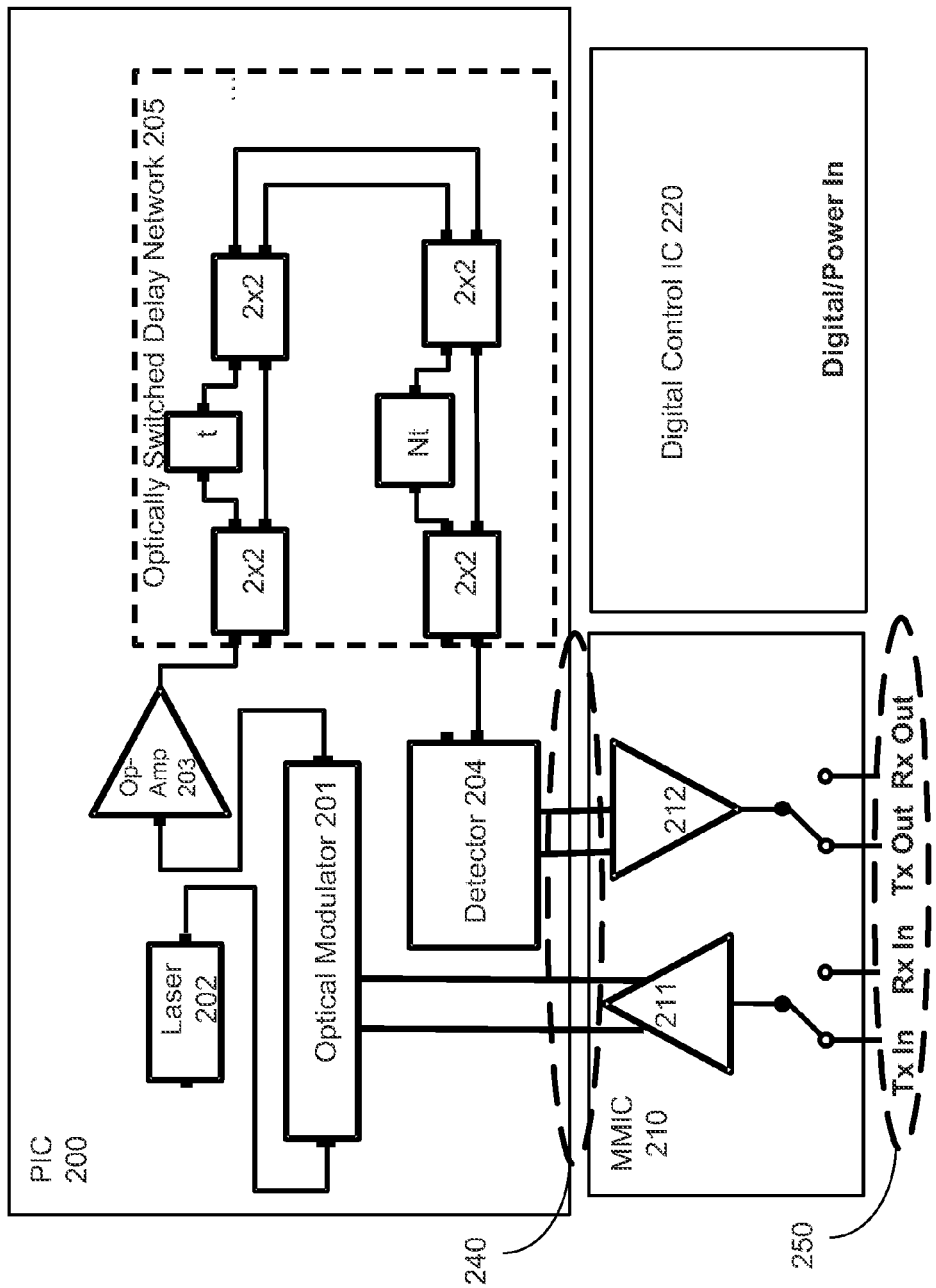
FIG. 2 is an illustration of integrated circuits used for microwave signal processing according to an embodiment of the invention.

FIG. 2 is an illustration of ICs used for microwave signal processing according to an embodiment of the invention. In this embodiment, microwave photonic integrated circuit (MPIC) 200 is illustrated as a Monolithic MPIC (MMPIC) that is communicatively coupled to RF function IC 210 and digital control IC 220. As mentioned previously, other embodiments may utilize discrete microwave components. In this embodiment, said ICs are shown to be separate chips; however, in other embodiments, two or more of said ICs may be integrated into a single substrate as described below.

RF function IC 210 receives/transmits RF signal data (shown as reference element 250) and forwards/receives said data from PIC 200 via ports 211 and 212, respectively. In this embodiment, RF function IC 210 and PIC 200 are electrically coupled such that said RF function IC exchanges electrical signal data with said PIC via coupling means 240.

In one embodiment, coupling means 240 allow for the transmission of RF signals from MMIC 210 into PIC 200, and the subsequent RF signal from PIC 200 to MMIC 210; said transmissions comprise an intensity modulated direct detection (IMDD) link. IMDD links are straightforward and commonly used optical transmission systems; however, neither intensity modulation (which produces an optical signal, the power of which is proportional to the modulating electrical signal amplitude) nor direct detection (which produces an electrical signal, the amplitude of which is proportional to detected optical power) preserves the optical phase or optical field amplitude for the data exchanged via coupling means 240.

In another embodiment, MMIC 210 and PIC 200 comprise a coherent optical link. In such links, the optical phase and/or optical field amplitude for the data exchanged via coupling means 240 is preserved and they typically achieve higher signal to noise ratios compared to IMDD.

In this embodiment, PIC 200 is shown to include modulator 201, laser 202, optical amplifier 203, detector 204 and photonic processing circuitry 205. Modulator 201 is configured to receive an optical carrier signal from laser 202 as input. When driven by an electrical modulation signal from MMIC 210, modulator 201 produces a corresponding optical output received by optical amplifier 203, and the optical signal is forwarded to circuitry 205 for processing. In other words, modulator 210 impresses the received RF signal data on the optical carrier signal provided by laser 202.

In this embodiment, processing circuitry 205 is shown to comprise an optically switched delay network. Said delay network splits the signal received from optical amplifier 203 into two paths; one of the paths delays the signal by means of a delay circuitry, and the amount of delay may be accumulated as the signal passes through a number of straight-through-state 2x2 optical switches. It is to be understood that the above functionality is an example of photonic processing, and is not meant to limit embodiments of the invention to utilize this type of processing. Other types of processing, such as phase shifting, optical filtering, optical mixing, etc., may be utilized in other embodiments of the invention.

In this embodiment, PIC 200 further includes detectors 204, each of which is configured to convert an optical signal received from processing circuitry 205 to an RF electrical signal transmitted to port 212 of MMIC 210. Other embodiments may not have these components.

In this embodiment, PIC 200 comprises a heterogeneous silicon PIC, which when referred to herein comprises a first region of silicon material and a second region of non-silicon material with high electro-optic efficiency (e.g., III-V material). The components of PIC 200 (e.g., components 201-205 as described above) are fabricated from the silicon and non-silicon material, and therefore may be interconnected via silicon/non-silicon waveguides formed from the above described regions of silicon/non-silicon material. The effect of interconnecting the components of PIC 200 via optical waveguides is that an RF signal may be processed using photonic components consistent with the size of MMIC 210, without the need for any optical fibers; therefore, the solution illustrated in FIG. 2 is a chip scale microwave IC that has the broad optical bandwidth of photonics without any optical interfaces to fiber.

Figure 3:
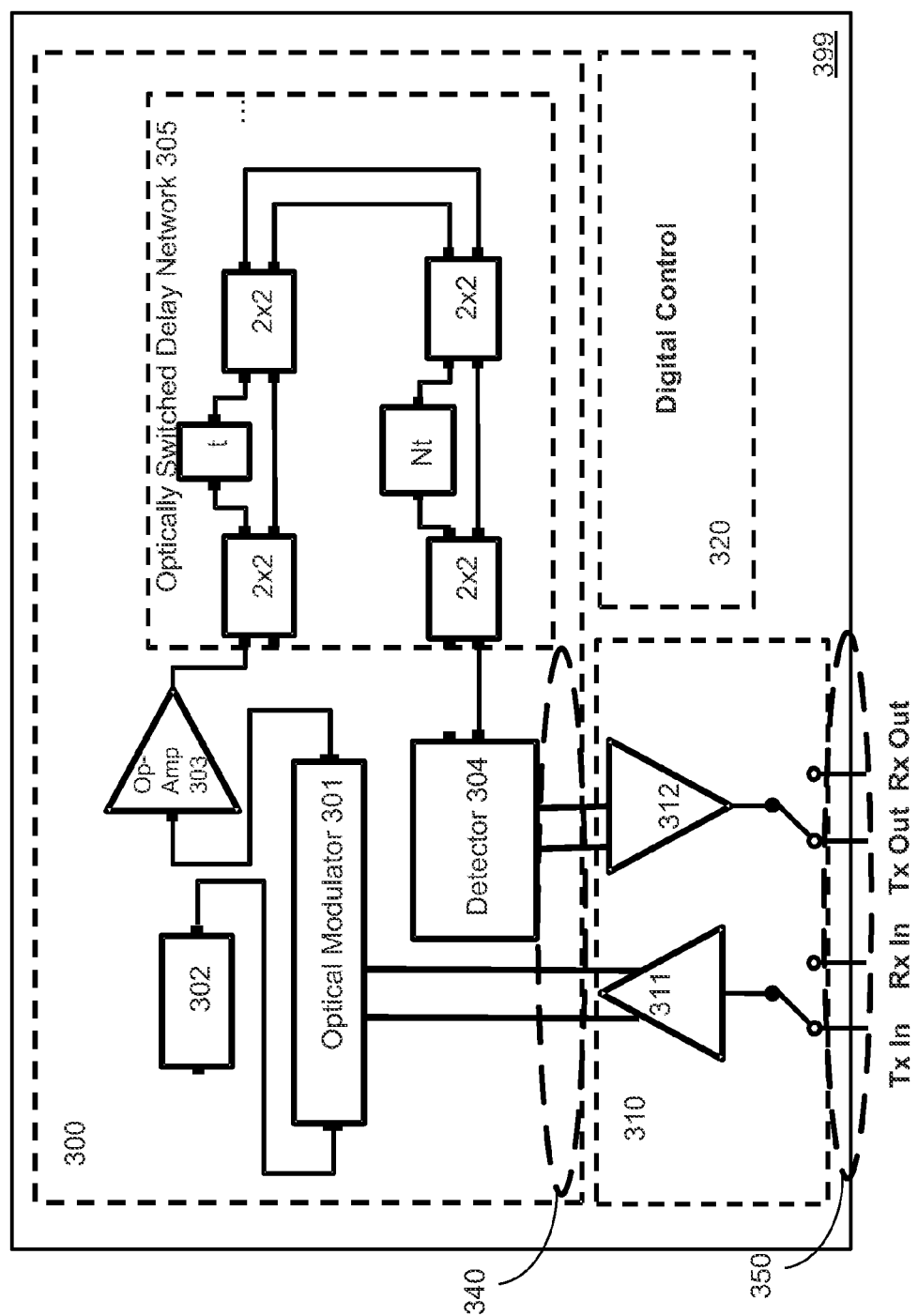
FIG. 3 is an illustration of a microwave signal processing system according to an embodiment of the invention.

FIG. 3 is an illustration of a microwave signal processing system according to an embodiment of the invention. Similar to the embodiment of FIG. 2, the processing system of this embodiment includes photonic component 300 communicatively coupled to RF function component 310 and digital control component 320. RF function component 310 receives/transmits RF signal data (shown as reference element 350) and forwards/receives said data via ports 311 and 312, respectively. In this embodiment, RF function component 310 and photonic component 300 are electrically coupled such that said RF function component exchanges electrical signal data with said photonic component via coupling means 340 (which may or may not preserve phase data as described above).

In this embodiment, photonic component 300 comprises both silicon and non-silicon regions (similar to PIC 200 of FIG. 2). Components 301-305 (which, for the sake of simplifying the description of this exemplary embodiment, are shown to comprise the same components as elements 201-205 of FIG. 2) are fabricated from the silicon and non-silicon material, and therefore may be interconnected via silicon/non-silicon waveguides formed from the above described regions of silicon/non-silicon material.

Embodiments of the invention may utilize RF function components comprised of the same non-silicon material as the photonic components; in this example, RF function component 310 is comprised of the same non-silicon material which partially comprises components 301-305. Furthermore, in this example embodiment, a non-silicon semiconductor slab includes both RF function component 310 and (at least part of) photonic component 300. Similarly, in this example embodiment digital control component 320 is comprised of silicon, and a silicon semiconductor slab includes both the digital control component and (at least part of) photonic component 300. Therefore, because said components share semiconductor slabs, and there is no need for optical fiber couplings, the system of FIG. 3 may be included in a single chip package, shown here as chip package 399, for performing photonic processing of RF signals 350.

Reference throughout the foregoing specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout the specification are not necessarily all referring to the same embodiment. Furthermore, the particular features, structures or characteristics may be combined in any suitable manner in one or more embodiments. In addition, it is appreciated that the figures provided are for explanation purposes to persons ordinarily skilled in the art and that the drawings are not necessarily drawn to scale. It is to be understood that the various regions, layers and structures of figures may vary in size and dimensions.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

The invention claimed is:

1. An apparatus comprising:
a photonic integrated circuit (PIC) to optically process a received first electrical signal data, and to output the optically processed electrical data as a second electrical signal data, the PIC including:
an input port for receiving the first electrical signal data from a transmission output port of a Microwave Integrated Circuit (MC);
a laser to provide an optical carrier;
a modulator to modulate the optical carrier, based on the received first electrical signal data, to transfer the received first electrical signal data to an optical signal data by impressing the received electrical signal data on the optical carrier;
optical processing circuitry to process the converted optical signal data received from the modulator;
an optical detector to receive the processed optical signal data from the optical processing circuitry, and to convert the processed optical signal data to the second electrical signal data; and
an output port to transmit the second electrical signal data, converted from the processed optical signal data, to a reception input port of the MIC;
wherein at least one of the laser, the modulator, the optical processing circuitry and/or the optical detector comprises a non-silicon material disposed on a silicon substrate, wherein the laser, the modulator, the optical processing circuitry and the optical detector and are communicatively coupled via waveguides formed from one or more of heterogeneous silicon/non-silicon regions, and wherein the optical processing circuitry comprises at least one of time delay, phase shift, and/or optical filtering circuitry.

2. The apparatus of claim 1, further comprising:
an intensity modulated direct detection link for detecting an intensity of the received first electrical signal data at the input port.

3. The apparatus of claim 1, further comprising:
a coherent optical link for detecting both intensity and phase of the received first electrical signal data at the input port.

4. The apparatus of claim 1, wherein the non-silicon region comprises III-V semiconductor material and the one or more of heterogeneous silicon-non-silicon regions comprise heterogeneous silicon/III-V regions.

5. The apparatus of claim 1, wherein the non-silicon region comprises crystal substrate material.

6. The apparatus of claim 1, wherein the optical processing circuitry is to process the converted optical data based on control data received from a digital control integrated circuit comprising silicon semiconductor material disposed on the silicon substrate.

7. A system comprising:
a Microwave Integrated Circuit (MIC) for receiving and/or transmitting radio frequency (RF) data, and having a transmission output port and a reception port to transmit and receive first and second electrical signal data, respectively;
a photonic integrated circuit (PIC) communicatively coupled to the input port and output port of the MIC to optically process the first electrical signal data, and to output the optically processed electrical data as the second electrical signal data, the PIC further comprising:
an input port for receiving a first electrical signal data from the transmission output port of the MIC;
a laser to provide an optical carrier;
a modulator to modulate the optical carrier, based on the received first electrical signal data, to convert the received first electrical signal data to an optical signal data by impressing the received electrical signal data on the optical carrier;
optical processing circuitry to process the converted optical signal data received from the modulator;
an optical detector to receive the processed optical signal data from the optical processing circuitry, and to convert the processed optical signal data to a second electrical signal data;
an output port to transmit the second electrical signal data, converted from the processed optical signal data, to the reception port of the MIC, wherein at least one of the laser, the modulator, the optical processing circuitry and/or the optical detector comprises a non-silicon material disposed on the silicon substrate, wherein the laser, the modulator, the optical processing circuitry and the optical detector and are communicatively coupled via waveguides formed from one or more of heterogeneous silicon/non-silicon regions, and wherein the optical processing circuitry comprises at least one of time delay, phase shift, and/or optical filtering circuitry; and
control circuitry, separate from the MIC and the PIC, to send control data signals to the optical processing circuitry of the PIC.

8. The apparatus of claim 1, wherein the PIC consists of no optical output interfaces to output optical signal data from the PIC.

9. The apparatus of claim 8, wherein the PIC consists of no optical input interfaces to receive optical signal data for the PIC.

10. The apparatus of claim 7, wherein the optical processing circuitry comprises time delay circuitry formed form silicon semiconductor material.

11. The system of claim 7, wherein the PIC further comprises an intensity modulated direct detection link for detecting an intensity of the received first electrical signal data at the input port.

12. The system of claim 7, wherein the PIC further comprises a coherent optical link for detecting an intensity and phase of the received first electrical signal data at the input port.

13. The system of claim 7, wherein the non-silicon region of the PIC comprises III-V semiconductor material and the one or more of heterogeneous silicon/non-silicon regions comprise heterogeneous silicon/III-V regions.

14. The system of claim 7, wherein the non-silicon region of the PIC comprises crystal substrate material.

15. The system of claim 7, wherein the MIC the PIC are formed from a same non-silicon semiconductor slab.

16. The system of claim 7, wherein the control circuitry and the PIC are formed from a same silicon semiconductor slab.

17. The system of claim 11, wherein the optical processing circuitry of the PIC comprises time delay circuitry formed form silicon semiconductor material.

* * * * *